April 9, 1963

C. L. MASSEY 3,084,630

APPARATUS FOR USE IN PUMPING WELLS

Filed Feb. 18, 1960

INVENTOR.
CURTIS L. MASSEY,
BY
ATTORNEY.

April 9, 1963
C. L. MASSEY
3,084,630
APPARATUS FOR USE IN PUMPING WELLS
Filed Feb. 18, 1960
4 Sheets-Sheet 2
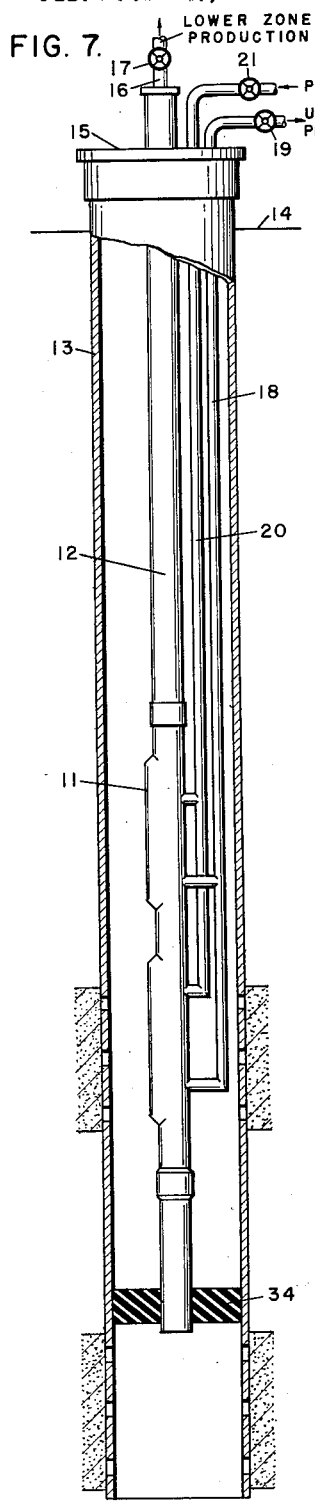
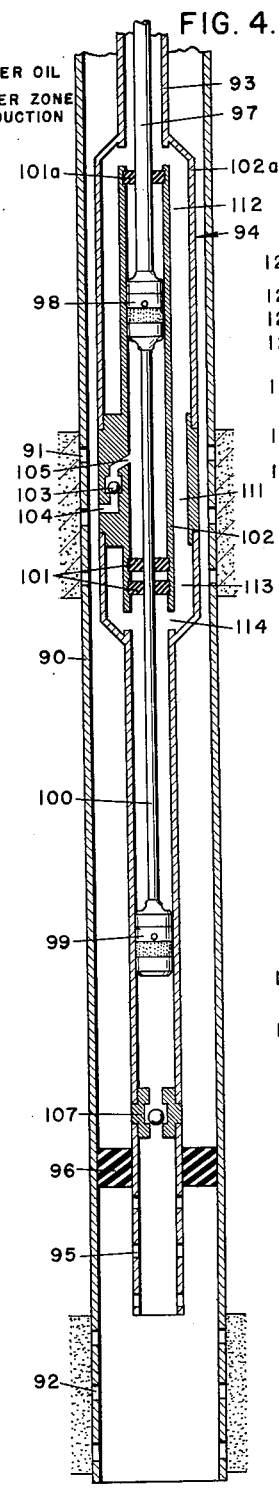
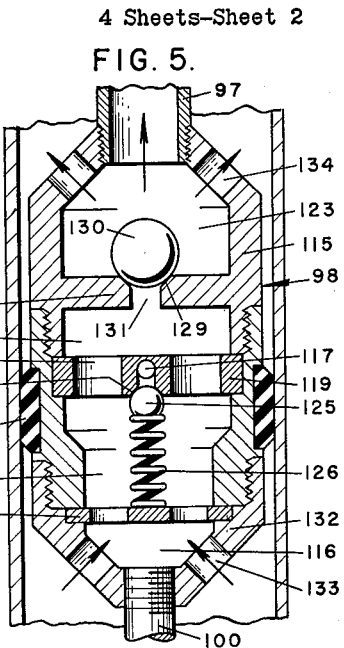
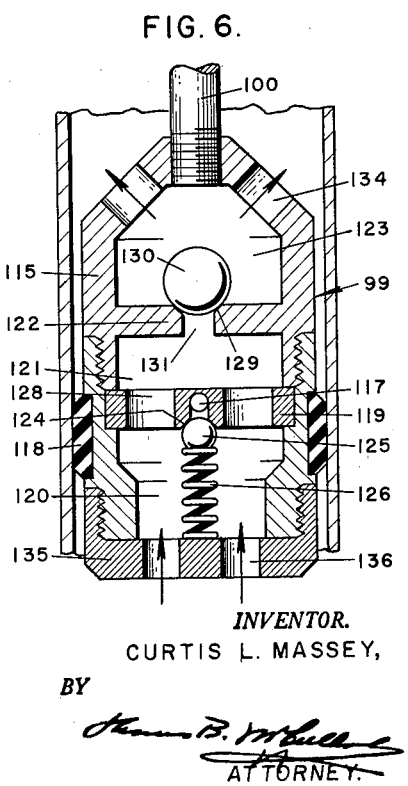
INVENTOR.
CURTIS L. MASSEY,
BY
ATTORNEY.

April 9, 1963   C. L. MASSEY   3,084,630
APPARATUS FOR USE IN PUMPING WELLS
Filed Feb. 18, 1960   4 Sheets-Sheet 3

*INVENTOR.*
CURTIS L. MASSEY,
BY
*ATTORNEY.*

April 9, 1963 C. L. MASSEY 3,084,630
APPARATUS FOR USE IN PUMPING WELLS
Filed Feb. 18, 1960 4 Sheets-Sheet 4

INVENTOR
CURTIS L. MASSEY,
BY
ATTORNEY 3,084,630
Patented Apr. 9, 1963

3,084,630
APPARATUS FOR USE IN PUMPING WELLS
Curtis L. Massey, Ferriday, La.
(P.O. Box 573, Immokalee, Fla.)
Filed Feb. 18, 1960, Ser. No. 9,537
10 Claims. (Cl. 103—4)

The present invention is directed on an improved subsurface pump. More particularly, the invention is concerned with a subsurface pump adapted for pumping hydrocarbons from a plurality of subsurface zones. In its more specific aspects, the invention is concerned with an improved valve for a subsurface pump.

This application is a continuation-in-part of Serial No. 807,232, entitled "Apparatus for Use in Pumping Wells," filed April 17, 1959, now abandoned, for Curtis L. Massey.

The present invention may be briefly described as the combination of a subsurface pump having a plurality of inlets and outlets and adapted to be arranged in a well for pumping fluids from a plurality of subsurface zones, the combination including a by-pass means arranged in at least one of the pumps which is openable on imposing a selected fluid pressure thereon for directing fluid from the discharge side of said pump back to the suction side of the pump. The bypass means is opened when the discharge pressure from the pump increases to the selected pressure on closing fluid communication from the pump outlet corresponding to the inlet whereby pumping from the other of the zones may be maintained at a selected rate.

The invention also includes a by-pass valve which is adapted to be arranged in a subsurface pump. The bypass valve comprises a housing having a cavity therein and a transverse partition or plate member is arranged in the cavity dividing the cavity into a first chamber and a second chamber. The housing is formed to provide a first inlet to the first chamber, and the partition or plate member is formed to provide a second inlet to the first chamber which fluidly communicates with the exterior of the housing. The partition member is provided with at least one port forming an outlet from the first chamber which fluidly communicates with the second chamber. The partition member is formed to provide a seating surface for the second inlet in the first chamber. A valve member in the second chamber is urged against the seating member by an urging means such as a spring in the second chamber. The valve member is movable away from the seating surface to open the second inlet on imposition of a fluid pressure against the valve member greater than the force of the urging means.

The invention is also directed to apparatus which is adapted to be arranged in and form part of subsurface pump. In this particular aspect of the invention, the valve housing has a second transverse partition member arranged in the cavity spaced vertically from the first transverse partition member to divide the cavity into first, second, and third chambers. The second transverse partition member is provided with a port for fluidly communicating the second chamber with the third chamber, the second partition member being formed to provide a seating surface for the port in the second partition in the third chamber. Arranged in the third chamber is a second valve member seatable on the seating surface and movable from the seating surface in the third chamber on reducing the pressure in the third chamber. By providing this apparatus with a sealing means such as a packing on its outer surface, the apparatus forms the plunger for a subsurface pump and is not only a reciprocating piston but also comprises a traveling valve and a by-pass valve of the present invention.

The present invention is adaptable to subsurface pumps which pump fluids such as hydrocarbons from separate, vertically spaced-apart subsurface zones and may suitably be a hydraulically operated pump which is retrievably arranged and seated in a well tubing. However, the apparatus is also adapted to be include in and form part of a rod pump which is operated by sucker rods extending in a tubing string to the wellhead at the earth's surface.

A problem exists in pumping dually completed wells in that when production from either of the spaced-apart hydrocarbon productive zones has reached the allowable rate allocated by the governmental agency for that zone, it is necessary, to avoid overproducing the one zone that has reached its allowable, to shut in both zones in such a pumping well. This results in the production from the other zone being less than the allowable and results in a substantial loss of income to the operator of the well.

In accordance with the present invention, this is entirely avoided and solved by providing in the pump a bypass means or valve which allows by-passing of the fluid from either zone when that zone is shut in at the surface. Thus the present invention allows pressure to be relieved on the shut-in zone at some selected maximum pressure and permits continuing pumping of the other zone.

The present invention will be further described an illustrated by reference to the drawing in which:

FIGS. 1A, 1B, and 1C comprise a sectional view of the present invention embodided in a retrievable hydraulic pump;

FIG. 4 is a schematic view in section of the application of the present invention to a rod pump;

FIGS. 5 and 6 are sectional views of the improved valve of the present invention as applied to the embodiment of FIG. 4;

FIG. 7 shows a wellhead of a well squipped with a hydraulic subsurface retrievable pump for shutting in either of the zones;

Figure 1A:
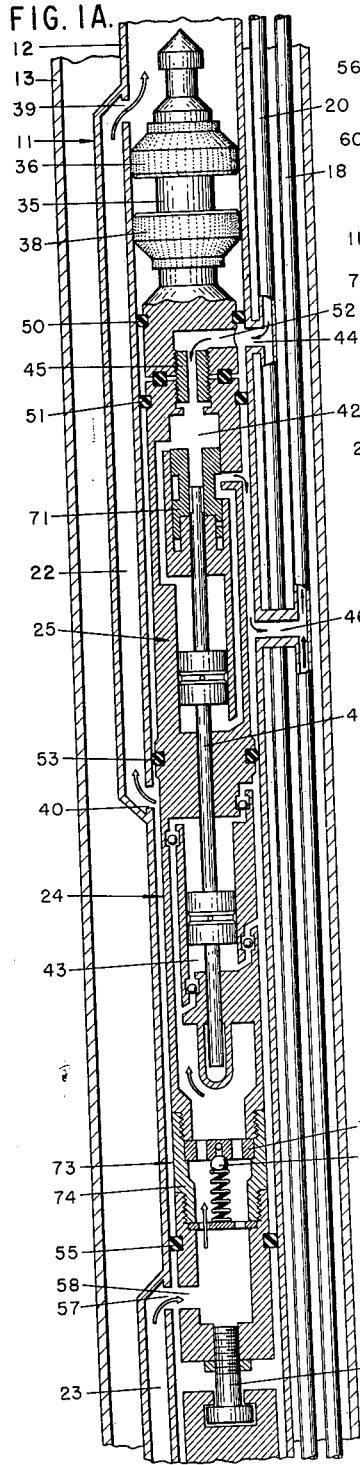
Figure 1B:
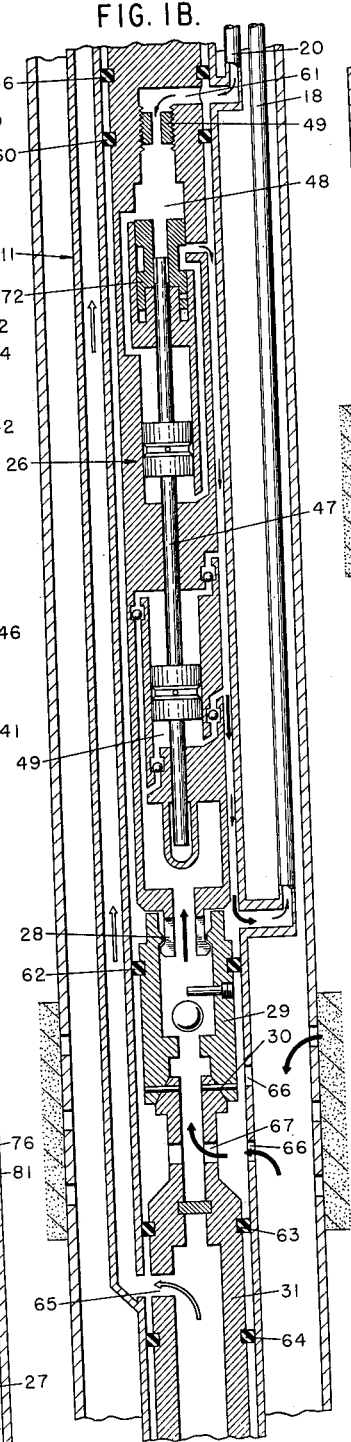
Figure 1C:
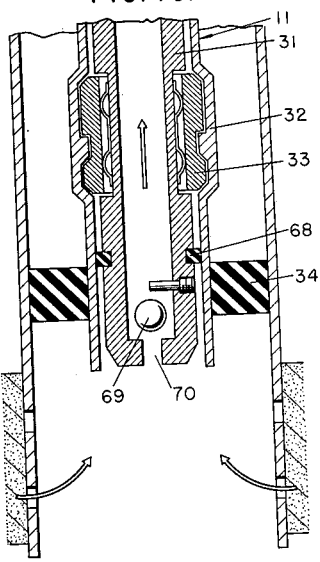
Figure 2:
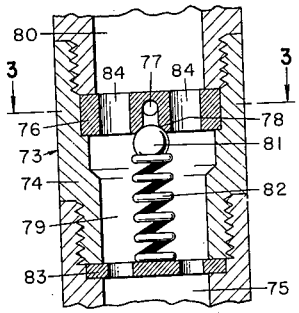
FIG. 2 is a sectional view of the by-pass valve of the present invention.
Figure 3:
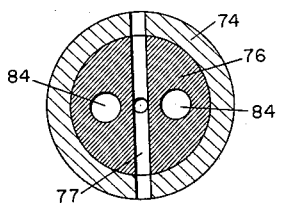
FIG. 3 is a sectional view taken along the lines 3—3 of FIG. 2.
Figure 8A:
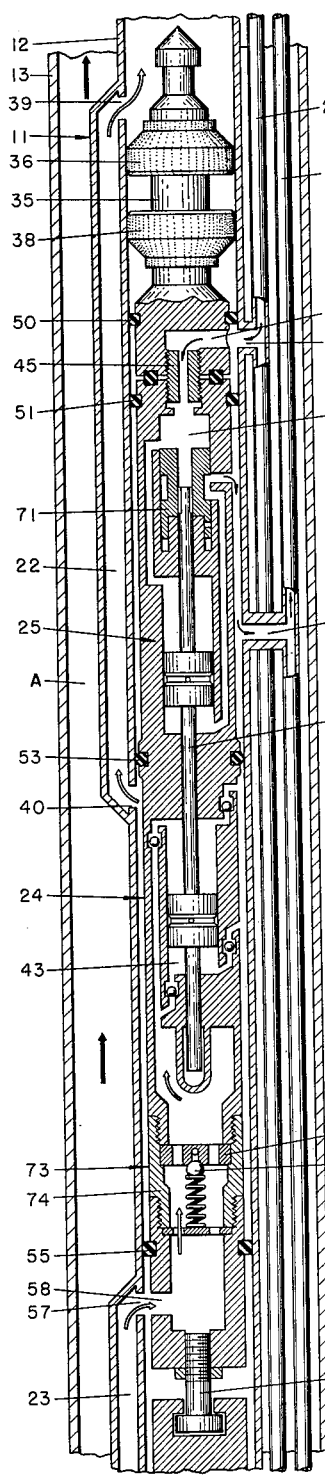
Figure 8B:
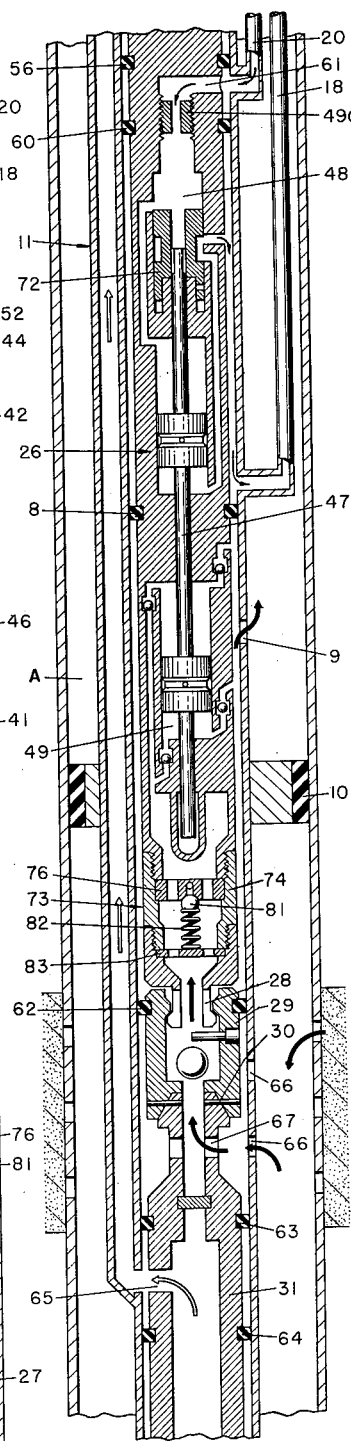
Figure 8C:
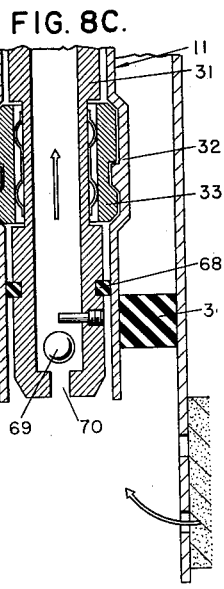
Figure 12:
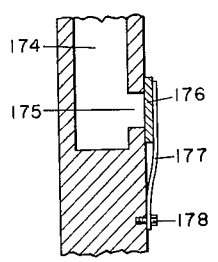
Figure 13:
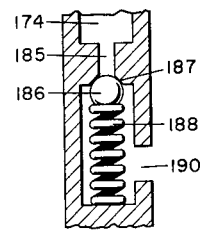
Figure 9:
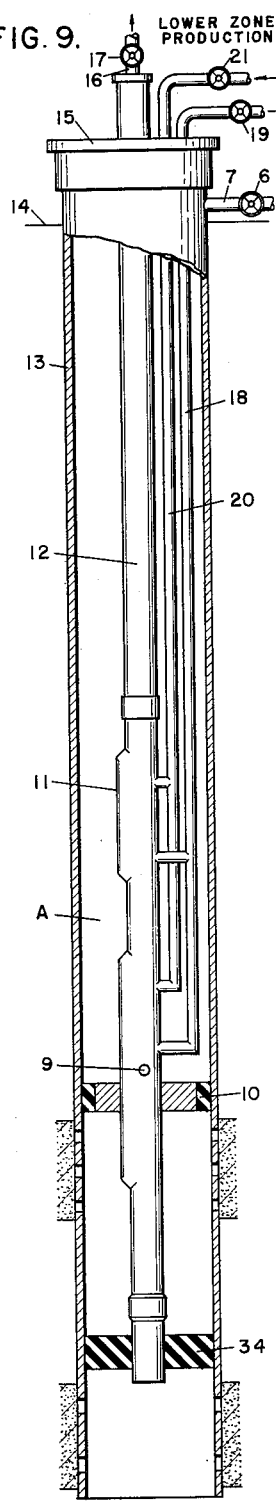
Figure 10:
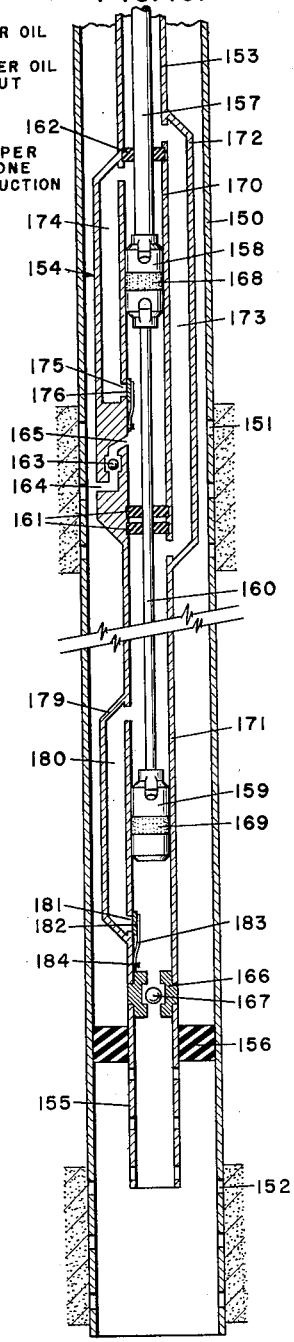
Figure 11:
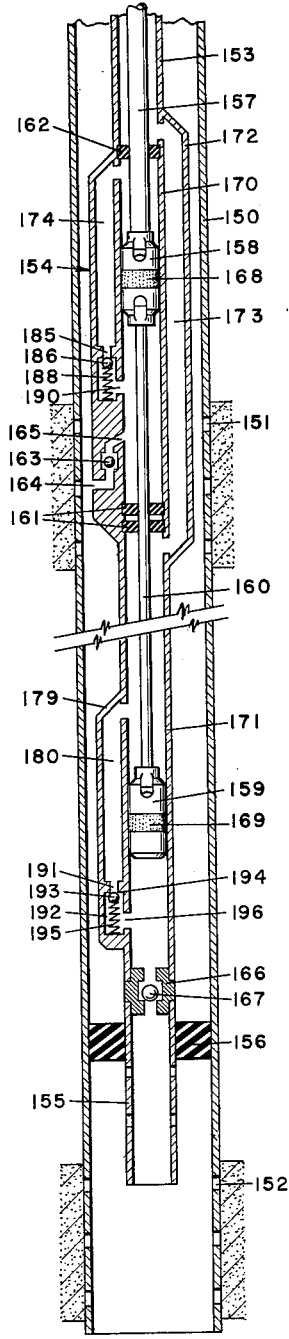

FIGS. 8A, 8B, and 8C comprise a sectional view of a modification of the present invention embodied in a retrievable hydraulic pump;

FIG. 9 is a similar view to FIG. 7 of a well equipped with a hydraulic subsurface retrievable pump as shown in FIGS. 8A, 8B, and 8C;

FIG. 10 is a further modification of the present invention in partial section showing the invention with a different kind of by-pass valve;

FIG. 11 is a further modification of the invention in partial section illustrating still another type of by-pass valve;

FIG. 12 is a partial enlarged sectional view of the by-pass valve of FIG. 10; and FIG. 13 is an enlarged partial sectional view of the by-pass valve of FIG. 11.

Referring now to the drawing and particularly to FIGS. 1A, 1B, 1C and 7, numeral 11 designates a housing which is attached to and forms part of the lower end of a tubing string such as 12 arranged in a casing 13 and cemented in a well, the casing extending to the earth's surface 14 and being closed in by the wellhead 15. The tubing is provided with a flow line 16 controlled by valve 17, the upper zone production from the well being removed by line 18 controlled by valve 19 while power fluid or hydraulic oil is introduced into the well by way of line 20 controlled by valve 21.

As will be noted, the housing 11 is provided with a conduit 22 for flow of lower zone production upwardly in the well tubing 12 and with a conduit 23 serving also to conduct lower zone production from the lower zone into the inlet of the pump as will be described further hereinafter.

Arranged in the housing 11 is a dual pump generally indicated by the numeral 24 comprised of an upper pump section 25 and a lower pump section 26, the pumps being interconnected by a suitable connecting means 27.

The combination pump 24 is releasably held in the housing 11 by a hold-down means 28 which is well known in the art and which may comprise suitable collets or latching means. Connected to the pump by hold-down means 28 is a standing valve assembly 29 which, in turn, is connected by a shear pin 30 to a tail pipe assembly 31 latched into a supporting means 32 by a locking dog 33 which may be spring biased into the supporting means 32. A packer 34 on the lower end of the tail pipe assembly 31 separates the lower zone production from the upper zone production. The power oil conduit 20 connects into the housing 11 and the upper zone production conduit 18 also connects into the housing 11.

The pump 24 comprised of upper pump section 25 and lower pump section 26 has a packer nose section 35 provided with a downwardly facing cup-type packer 36 and upwardly facing cup-type packer 38 forming a seal with the inner surface of the housing 11 below a port 39 which communicates with the passageway 22 to allow passage of fluid around the packer nose assembly 35 by entry of fluid into the conduit 22 through the port 40.

The upper pump 25 has a piston assembly 41 which reciprocates in the piston chambers 42 and 43 by action of hydraulic fluid introduced by lateral conduit 44 into the chamber 42 through choke 45 with the power fluid being discharged into conduit 18 by passageway 46 for admixture with the upper zone production, the power oil usually being the oil from the upper zone.

The lower pump 26 is also provided with a piston assembly 47 which reciprocates in chambers 48 and 49 on introduction of power fluid through conduit 20 into the chamber 48 through choke 49a, the power fluid discharging into line or conduit 18 which also conducts the upper zone production to the wellhead.

The pump assembly 24 is provided with suitable seals 50 and 51 which isolate the port 52 through which the power oil is introduced into chamber 42 and with the seal 53 which seals between the upper pump 25 and the inner wall of the housing 11. Seals 55 and 56 isolate the port 57, which conducts the lower zone production through the conduit 23 into the inlet 58 of the upper pump 25, while seals 56 and 60 isolate the port 61 which allows power oil to be introduced into the chamber 48. Seal 62 isolates the discharge of power oil and upper zone production such that it may be conducted to the earth's surface through conduit or line 18. Seals 63 and 64 isolate the port 65 and allow the lower zone production to be flowed through the conduit 23 by way of port 57 into the inlet 58 of the upper pump, the seals 62 and 63 also isolating the upper zone production which is introduced by ports 66 into standing valve 29 by way of standing valve inlet 67.

The tail pipe assembly 31 is provided with a seal 68 which seals the tail pipe assembly in the lower part of the housing 11, the tail pipe assembly 31 being provided with a valve 69 which allows fluid to be introduced through lower port 70 into the tail pipe assembly 31 from the lower zone.

The upper pump 25 and the lower pump 26 are provided, respectively, with motor or engine valves 71 and 72 for proper operation thereof.

In accordance with the present invention, the pump 25 is provided with a by-pass valve generally indicated by the numeral 73 and formed of a housing 74 having a first inlet 75. The housing 74 is provided with a transverse partition or plate member 76 which forms an inlet 77 which communicates with the exterior of the housing 74 and which is provided with a seating surface 78. The plate member 76 divides a cavity in the housing 74 into a first chamber 79 and into a second chamber 80. A ball valve member 81 is urged against the seating surface 78 by an urging means such as a helical coil spring 82 which rests against the ball valve member 81 and against a spider or supporting means 83 in the valve inlet 75. The plate member 76 is provided with a plurality of ports 84 which allow fluid to pass from the chamber 79 into the chamber 80, the chamber 80 communicating with the upper pump chamber 43. In the embodiment of FIGS. 1A, 1B, 1C and 2, it will be noted that the by-pass valve 73 is arranged in the inlet of the pump 25 and may form an integral part thereof. It will be further noted that the by-pass valve fluidly communicates the discharge side of the pump with the suction side.

Referring now to FIGS. 4, 5, and 6, the invention will be described with respect to a rod-operated pump. In this embodiment of the present invention, a casing 90 perforated in an upper zone to provide perforations 91 and in a lower zone to provide perforations 92 has arranged therein a tubing 93 carrying adjacent its lower end a pump assembly generally indicated by the numeral 94, to which is attached a perforated nipple 95 arranged in a packer 96 which separates the upper zone perforations 91 from the lower zone perforations 92. Connected to a hollow sucker rod or small tubing 97 extending from the wellhead through the tubing 93 is an upper pump plunger generally indicated by the numeral 98 and a lower pump plunger generally indicated by the numeral 99, the upper pump plunger 98 and the lower pump plunger 99 being interconnected by a space rod 100. Space rod 100 and tubing 97 are slidable in packing or seals 101 and 101a, respectively, in seal barrel 102, which seals serve to isolate the upper zone production from the lower zone production.

The pump 94 has an upper standing valve 103 which communicates with the upper zone perforations 91 through an inlet 104 and with the upper plunger 98 by an outlet 105, the inlet and outlet of the upper standing valve being closed and opened on reciprocation of the upper pump plunger 98.

Below the lower pump plunger 99 and above the perforations of the perforated nipple 95 is a standing valve assembly 107, which may comprise a ball check valve and being opened and closed on reciprocation of the lower pump plunger 99.

The seal barrel 102 is enclosed in housing 102a which has a longitudinal passageway 111 therein which conducts lower zone production from the lower plunger 99 into the space 112 and thence to the earth's surface through the tubing 93, the fluid from the lower zone being conducted from a space 113 into the passageway 111 and the fluid flowing into the space 113 by way of an opening 114 which communicates with the lower pump plunger 99.

The production from the upper zone proceeds to the earth's surface through hollow sucker rod 97.

Referring now to FIG. 5, the upper pump plunger 98 is shown in more detail. In this particular embodiment, the upper pump plunger 98 comprises a housing 115 having a first inlet 116 and provided with a second inlet 117. A plunger packing or other sealing element 118 is arranged on the exterior of the housing 115 between the inlets 116 and 117.

A first transverse partition or plate member 119, which is similar to partition or plate member 76, divides the cavity in housing 115 into a first chamber 120 and a second chamber 121 while a second transverse partition member 122, which is vertically spaced from transverse partition member 119, divides the cavity into a third chamber 123. Chamber 123 communicates with the passageway in hollow sucker rod 97 and with the exterior of housing 115 by ports 134. The first transverse partition member 119 is formed to provide a seating surface 124 for the inlet 117 in the chamber 120 to seatingly receive a valve member 125 which is urged against the seating surface 124 by an urging means such as helical coil spring 126 supported on a spider such as 127 in the inlet 116.

As noted in FIG. 5, the space rod 100 is attached to the lower end of the housing 115 by member 132 provided with ports 133 communicating with inlet 116.

Transverse partition member 119 is also provided with ports 128 which are similar to ports 84 in plate member 76 and provide communication between the chambers 120 and 121.

The transverse partition member 122 is formed to provide a seating surface 129 in chamber 123 for seatingly receiving a valve member 130 to close the port 131 when the pressure in chamber 123 exceeds the pressure in chamber 121.

The lower pump plunger 99, as shown in FIG. 6, is identical with the upper pump plunger 98 with the exception that spider 127 of FIG. 5 is replaced by closure member 135 provided with ports 136.

Referring now to FIGS. 8A, 8B, 8C and 9 in which identical numerals are employed to designate identical parts to those in FIGS. 1A, 1B, 1C and 7, this embodiment is identical to FIGS. 1A, 1B, 1C and 7 excepting identical by-pass valves 73 are provided in pump sections 25 and 26 of pump 24. Pump section 25 of FIG. 8A is identical to pump section 25 of FIG. 1A but pump section 26 of FIG. 8A differs from pump section 26 of FIG. 1A in being provided with a by-pass valve 73 and with a packer 10 which closes the annulus A above the upper zone such that production from the upper zone may be produced to the earth's surface through annulus A, being discharged therein from port 9, which production is isolated from line 18 by a seal 8 whereby the fluids separately produced from the upper zone and the power fluid are prevented from commingling. It is to be noted that in FIGS. 1A to 1C, the fluid produced from the upper zone commingles with the power fluid (being the same) whereas in FIGS. 8A, 8B, 8C and 9 production from the upper zone proceeds up the annulus A.

Referring to FIG. 9, which is identical to FIG. 7, the wellhead 15 is provided with a conduit 7 controlled by valve 6 for controlling production from the upper zone in a similar manner to that which has been described with respect to FIGS. 1A, 1B, 1C and 7.

Referring now to FIG. 10, a casing 150 is perforated in an upper zone to provide perforations 151 and in a lower zone to provide perforations 152. Arranged in the casing 150 is a tubing 153 carrying adjacent its lower end a pump assembly generally indicated by the numeral 154 to which is attached a perforated nipple 155 which extends through a packer 156 and which separates the perforations 151 from the perforations 152. Connected to a hollow sucker rod or small tubing 157 is an upper pump plunger 158 and a lower pump plunger 159. Space rod 160 is slidable in seals 161 and the sucker rod 157 is slidably arranged in a seal 162. The upper pump plunger 158 has an upper standing valve 163 which communicates with the upper perforations 151 by inlet 164 and with the upper plunger 158 by outlet 165, the inlet and outlet 164 and 165 being alternately closed and opened on reciprocation of the upper pump plunger 158. Below the lower pump plunger 159 and above the perforations 152 is a standing valve assembly 166 which comprises a ball check valve 167 which is opened and closed on reciprocation of the lower pump plunger 159.

Pump plungers 158 and 159 are similar to pump plungers 98 and 99 excepting that the valve assembly comprised of the plate member 119, the valve member 125 and the urging means 126 is omitted and pump plungers 158 and 159 are not provided with an inlet communicating with the outer surface thereof. Pump plunger 158 is provided with a seal 168 while pump plunger 159 is provided with a seal 169. Pump plungers 158 and 159 are reciprocally mounted in seal barrels 170 and 171, respectively. The seal barrel 170 is enclosed in a housing generally indicated by the numeral 172 which is provided with a passageway 173 which provides for communication below the seals 161 with the tubing 153 and is also provided with a passageway 174 which communicates the discharge of the pump plunger 158 with the suction side thereof through a port 175 closed by a flapper valve 176 which is shown more clearly in FIG. 12 and which is provided with a spring 177 bolted by bolt 178 to the housing 172.

The lower pump plunger 159 is also enclosed in a housing generally indicated by the numeral 179 which provides a passageway 180 communicating the discharge side of the pump plunger 159 with the suction side of the pump plunger 159 through port 181 closed by flapper valve 182 provided with a spring 183 which is bolted to the housing 179 by bolt 184.

Referring now to FIGS. 11 and 13, which are identical to FIGS. 10 and 11 excepting that a different type of valve is employed, the housing 172 has a passageway 174 which communicates with the discharge side of the pump plunger 158 through a port 185 closed by a check valve 186 urged against a seat 187 by a helical coil spring 188. The helical coil spring 188 and the check valve 186 are arranged in a cavity 189 in the housing 172 and communicate by port 190 with the suction side of pump plunger 158.

The housing 179 is provided with a passageway 180 which fluidly communicates with a port 191 which, in turn, communicates with a cavity 192 having a check valve 193 urged against a seat 194 by a helical coil spring 195. The port 191, cavity 192, check valve 193, seat 194 and spring 195 are identical to those described with respect to similar elements for the upper pump plunger 158. The cavity 192 communicates with the suction side of pump plunger 159 by a port 196.

The present invention operates as follows with respect to FIGS. 1A, 1B, 1C, 2, 3, and 7. Assuming that the valve 17 in the conduit 16 is closed and the lower zone production is shut-in, the by-pass valve 73 would be caused to function by the pump pressure increasing to a point that the fluid pressure exerted against the ball valve 81 would cause depression of the spring 82 which would cause the valve 81 to unseat from the surface 78 and allow the fluid which passes through the ports 84 into the pump chamber 43 to be recirculated back through the inlet 77 into the chamber 79 allowing both pumps to run at the selected operation to cause maximum pumping from the upper zone with the lower pump 26.

The operation with respect to FIGS. 4 and 5 would be similar to that described with respect to the other figures of the drawing, assuming again that the lower zone has been closed off at the earth's surface, production would no longer proceed through the tubing 93 and, therefore, the lower pump plunger 99 would function as follows, referring to FIG. 6: with the pressure exerted in inlet 117 against the ball valve 125, the spring 126 would be compressed, unseating the ball 125 from the surface 124. Thus, the fluid flowing through the ports 128 on exerting differential pressure in chamber 123 unseats the ball 130 and this fluid then flows back around the housing 115 and into the inlet 117.

The embodiments of FIGS. 8A, 8B, 8C and 9 operate similarly to the embodiments of FIGS. 1A, 1B, 1C, 2, 3, and 7. For example, referring to FIGS. 8A, 8B, 8C and 9, assume that the valve 6 in the conduit 7 communicating with the annulus A is closed and the upper zone production is shut-in, then the by-pass valve 73 in the pump section 26 would be caused to function by the pump pressure increasing to the point that the fluid pressure exerted against the ball valve 81 would cause depression of the spring 82 which, in turn, would cause the valve 81 to unseat and allow the fluid which passes through the ports 84 into the pump chamber to be recirculated back through the inlet allowing both pumps to run at the selected operation to cause maximum pumping from the lower zone with the upper pump 25.

The operation with respect to FIGS. 10 to 13, inclusive, is similar to that described in the other figures of the drawing excepting in this particular instance closing off of one zone would cause either the flapper valves of FIGS. 10 and 12 or the check valves of FIGS. 11 and 13 to open, depending on what zone is closed in.

In all of the several embodiments of the present invention, it will be clear from the description taken with the drawing that the pump is formed to provide an inlet passage integral with the pump to the bypass valve means from the discharge side of the pump which allows the pump to continue pumping even though shut-in at the surface.

From the foregoing description taken with the drawing, it will be seen that the present invention is quite advantageous and useful and provides a means by way of which one of dually operated pumps may be shut-in while the other of the pumps may continue to operate at maximum rate and efficiency. The present invention is, therefore, quite advantageous and useful.

The nature and objects of the present invention having been completely described and illustrated, what I wish to claim as new and useful and secure by Letters Patent is:

1. In combination with dual subsurface pumps adapted to be arranged in a well tubing for pumping fluid simultaneously from first and second vertically spaced-apart subsurface zones, a pump housing connected to said tubing, said pumps being arranged in said housing and forming therewith discharge chambers, said pumps each having an inlet in fluid communication with one of said zones and having separate conduits leading from said discharge chambers to the earth's surface, said pumps operating from a common source of power, apparatus which comprises by-pass means arranged in at least one of said pumps, said by-pass means comprising normally closed valve means in said one of the pumps communicating fluidly the inlet of said one of the pumps with the discharge chamber of said one of the pumps, means for normally urging said valve means into closed position, said one of said pumps being formed to provide a passage within said one of said pumps leading from the discharge chamber of said one of said pumps to said valve means for delivery of fluid at a selected pressure from said discharge chamber to said valve means sufficient to overcome said urging means and to open said valve means, means in one of said conduits for closing fluid communication from said discharge chamber of said one of the pumps to increase the pressure of the discharge fluid to said selected pressure whereby operation of both pumps is maintained while pumping from said one of said zones is discontinued and pumping from the other of said zones is continued.

2. Apparatus in accordance with claim 1 in which the pumps are retrievable hydraulic pumps.

3. In combination with dual subsurface pumps and adapted to be arranged in a well tubing for pumping fluids simultaneously from a plurality of subsurface zones, a pump housing connected to said tubing, said pumps being arranged in said pump housing and forming therewith annular discharge chambers, said pumps each having an inlet in an end in fluid communication with one of said zones and having separate conduits leading from said discharge chambers to the earth's surface, said pumps operating from a common source of power, apparatus which comprises by-pass means arranged in at least one of said pumps to communicate fluidly the inlet and discharge chamber of said one of said pumps and openable on imposing a selected fluid pressure thereon for directing fluid from the discharge chamber of said one of said pumps to the inlet of said one of said pumps, said by-pass means comprising a second housing formed by the inlet end of said one of said pumps and having a cavity therein, a transverse partition member arranged in said cavity dividing said cavity into a first chamber and a second chamber, said second housing being formed to provide a first inlet to the first chamber and said partition member being formed to provide a second inlet to said first chamber fluidly communicating with the exterior of said second housing and the annular discharge chamber of said one of said pumps, said inlets to the first chamber being isolated from each other, said first inlet to the first chamber fluidly communicating separately with the exterior of said second housing and the inlet of said one of said pumps, said partition member being provided with at least one port forming an outlet from said first chamber fluidly communicating with said second chamber for delivery of fluid to the inlet of said one of said pumps, said partition member being formed to provide a seating surface on said second inlet in said first chamber, a valve member adapted to seat on said seating surface, and means in said first chamber normally urging said valve member against said seating surface to close said second inlet, said by-pass means being opened by said valve member being moved away from said seating surface when the pressure of the discharge fluid from said one of said pumps increases to said selected pressure greater than the force of said urging means, means in one of said conduits for closing fluid communication from the discharge chamber of said one of said pumps to increase the pressure of the discharge fluid to said selected pressure whereby operation of both of said pumps is maintained while pumping from said one of said zones is discontinued and pumping from the other of said zones is continued.

4. Apparatus in accordance with claim 3 in which the pumps are hydraulic pumps.

5. In combination with a dual subsurface pump actuated by a rod and adapted to be arranged in a well tubing for pumping fluids simultaneously from a plurality of subsurface zones, said pump having two spaced-apart pistons attached to said rod for reciprocal movement with said rod, a pump housing connected to said tubing, said pistons being arranged in said pump housing and forming therewith discharge chambers, said pistons having separate inlets in fluid communication with said zones, said pump having conduits leading from said discharge chambers to the earth's surface, one of said conduits being formed by said rod and the other of said conduits being said tubing to which said pump is connected, said rod being connected to a source of power, apparatus which comprises by-pass means arranged in at least one of said pistons to communicate fluidly the inlet and discharge chamber of said one piston and openable on imposing a selected fluid pressure thereon for directing fluid from the discharge chamber of said one piston to the inlet of said one piston, said by-pass means comprising a second housing forming said one piston and having a cavity therein, a transverse partition member arranged in said cavity dividing said cavity into a first chamber and a second chamber, said second housing being formed to provide a first inlet to the first chamber and said partition member being formed to provide a second inlet to said first chamber, said second inlet to the first chamber fluidly communicating with the exterior of said second housing, said inlets to the first chamber being isolated from each other, said first inlet to the first chamber fluidly communicating separately with the exterior of said second housing and the pump inlet to said one piston, said partition member being provided with at least one port forming an outlet from said first chamber fluidly communicating with said second chamber for delivery of fluid to the discharge chamber of said one piston and the exterior of said second housing, said partition member being formed to provide a seating surface on said second inlet in said first chamber, a valve member adapted to seat on said seating surface, and means in said first chamber normally urging said valve member against said seating surface, said by-pass means being opened by said valve member being moved from said seating surface when discharge pressure from said one piston increases to said selected pressure greater than the force of said urging means, means in one of said conduits for closing fluid communication from the discharge chamber of said one piston to increase the pressure of the discharge fluid to said selected pressure whereby operation of both of said pistons is continued while pumping from said one of said zones is discontinued and pumping from the other of said zones is continued.

6. Apparatus in accordance with claim 1 in which the pumps are rod pumps.

7. Apparatus in accordance with claim 1 in which the valve means is a flapper valve.

8. Apparatus in accordance with claim 1 in which the valve means is a check valve.

9. Apparatus in accordance with claim 1 in which the valve means is arranged in the wall of said pump.

10. Apparatus in accordance with claim 1 in which the valve means is arranged in one of the inlets to said pumps.

References Cited in the file of this patent

UNITED STATES PATENTS

| | | |
|---|---|---|
| 614,902 | Siegrist | Nov. 29, 1898 |
| 1,066,798 | Conrader | July 8, 1913 |
| 1,102,066 | Mathias | June 30, 1914 |
| 1,170,873 | Brown | Feb. 8, 1916 |
| 1,396,494 | Wright | Nov. 8, 1921 |
| 1,563,545 | Blakeslee | Dec. 1, 1925 |
| 1,780,217 | Wiltse | Nov. 4, 1930 |
| 1,943,102 | Woodruff | Jan. 9, 1934 |
| 2,149,602 | Horvath | Mar. 7, 1939 |
| 2,352,197 | Harvey | June 27, 1944 |
| 2,390,762 | Wollfer | Dec. 11, 1945 |
| 2,462,257 | Cunningham | Feb. 22, 1949 |
| 2,628,563 | Coberly | Feb. 17, 1953 |
| 2,668,500 | Hoffer | Feb. 9, 1954 |
| 2,870,776 | Marsh | Jan. 27, 1959 |
| 2,951,445 | Calvert | Sept. 6, 1960 |